(12) United States Patent
Harrell

(10) Patent No.: US 12,291,354 B2
(45) Date of Patent: May 6, 2025

(54) AIRCRAFT ACTUATOR VERIFICATION SYSTEM AND METHOD

(71) Applicant: Textron Innovations Inc., Providence, RI (US)

(72) Inventor: Clifton Lee Harrell, Arlington, TX (US)

(73) Assignee: Textron Innovations Inc., Providence, RI (US)

( * ) Notice: Subject to any disclaimer, the term of this patent is extended or adjusted under 35 U.S.C. 154(b) by 211 days.

(21) Appl. No.: 18/159,461

(22) Filed: Jan. 25, 2023

(65) Prior Publication Data

US 2024/0246698 A1 Jul. 25, 2024

(51) Int. Cl.
*B64F 5/60* (2017.01)
*B64D 45/00* (2006.01)

(52) U.S. Cl.
CPC .............. *B64F 5/60* (2017.01); *B64D 45/00* (2013.01)

(58) Field of Classification Search
CPC ..... B64C 13/503; B64C 27/605; B64C 27/64; B64D 45/00; B64F 5/60
USPC ........................................................ 701/31.7
See application file for complete search history.

(56) References Cited

U.S. PATENT DOCUMENTS

| | | | |
|---|---|---|---|
| 5,806,805 A | 9/1998 | Elbert et al. | |
| 9,944,384 B2 * | 4/2018 | Violette | G05D 1/102 |
| 10,196,131 B2 * | 2/2019 | McCormick | B64C 13/504 |
| 11,353,890 B1 * | 6/2022 | Auerbach | B64D 27/24 |
| 11,442,547 B1 * | 9/2022 | Richard | H04R 1/02 |
| 2012/0025033 A1 * | 2/2012 | Huynh | B64D 45/0005 244/230 |
| 2013/0026298 A1 | 1/2013 | Kirkland | |

(Continued)

FOREIGN PATENT DOCUMENTS

| | | | | |
|---|---|---|---|---|
| CA | 3147201 A1 * | 8/2022 | ........... | B64C 11/301 |
| EP | 3415417 A1 * | 12/2018 | ............. | B64C 13/16 |

(Continued)

OTHER PUBLICATIONS

Ijaz, Salman et al., "Fractional Order Control of Dissimilar Redundant Actuating System used in Large Air Craft," 2017 29th Chinese Control and Decision Conference (CCDC), IEEE, May 28, 2017 (May 28, 2017), pp. 3686-3691, XP033121214 DOI: 10.1109/CCDC.2017.7979145.

*Primary Examiner* — Atul Trivedi
(74) *Attorney, Agent, or Firm* — Slater Matsil, LLP

(57) ABSTRACT

In an embodiment, an aircraft includes an actuator and a flight control computer interfaced with the actuator. The flight control computer is configured to: increase an initiating force output by an initiating channel of the actuator; stop the increasing of the initiating force in response to observing restraining forces on restraining channels of the actuator; hold the initiating force at a quiescent initiating value while the restraining channels hold the restraining forces at quiescent restraining values; increase the initiating force to a target initiating value while the restraining channels increase the restraining forces to target restraining values; calculate a force fight test result by summing a difference between the target initiating value and the quiescent initiating value with differences between the target restraining values and the quiescent restraining values; and indicate the actuator failed verification in response to the force fight test result being greater than a first predetermined threshold.

20 Claims, 8 Drawing Sheets

(56) References Cited

U.S. PATENT DOCUMENTS

| | | | | |
|---|---|---|---|---|
| 2013/0201316 | A1* | 8/2013 | Binder | H04L 67/12 |
| | | | | 701/2 |
| 2015/0360771 | A1 | 12/2015 | Cotton et al. | |
| 2017/0307090 | A1 | 10/2017 | Defusco | |
| 2018/0334246 | A1* | 11/2018 | Lee | F02K 1/002 |
| 2018/0364707 | A1* | 12/2018 | Bosworth | B64D 45/0056 |
| 2019/0161182 | A1* | 5/2019 | Alfred | G05D 1/0061 |
| 2020/0156762 | A1* | 5/2020 | Tillotson | B64C 5/08 |
| 2020/0172066 | A1* | 6/2020 | Burte | B60T 8/1703 |
| 2020/0290728 | A1* | 9/2020 | Chu | B64C 27/57 |
| 2020/0307780 | A1* | 10/2020 | Worsham, II | B64D 45/00 |
| 2021/0049919 | A1* | 2/2021 | Davis | B64D 31/06 |
| 2021/0354809 | A1* | 11/2021 | Grohmann | B64D 45/0051 |
| 2022/0281587 | A1 | 9/2022 | Harrell et al. | |
| 2022/0315205 | A1* | 10/2022 | Moy | B64D 27/34 |
| 2022/0326727 | A1* | 10/2022 | Cowling | G05G 5/03 |
| 2023/0202676 | A1* | 6/2023 | Donnelly | B64D 45/04 |
| | | | | 701/18 |
| 2024/0246698 | A1* | 7/2024 | Harrell | B64F 5/60 |

FOREIGN PATENT DOCUMENTS

| | | | | |
|---|---|---|---|---|
| EP | 3620373 | A1 | 3/2020 | |
| GB | 2540180 | A * | 1/2017 | ............ B60T 8/1703 |
| WO | WO-2020081615 | A1 * | 4/2020 | ............ B64C 13/00 |
| WO | WO-2020125839 | A1 * | 6/2020 | ............ G06F 21/31 |

* cited by examiner

AIRCRAFT ACTUATOR VERIFICATION SYSTEM AND METHOD

BACKGROUND

A rotorcraft may include one or more rotor systems including one or more main rotor systems. A main rotor system generates aerodynamic lift to support the weight of the rotorcraft in flight and thrust to move the rotorcraft in forward flight. Another example of a rotorcraft rotor system is a tail rotor system. A tail rotor system may generate thrust in the same direction as the main rotor system's rotation to counter the torque effect created by the main rotor system. For smooth and efficient flight in a rotorcraft, a pilot balances the engine power, main rotor collective thrust, main rotor cyclic thrust, and the tail rotor thrust, and a control system may assist the pilot in stabilizing the rotorcraft and reducing pilot workload. The rotor systems of a rotorcraft are controlled by actuators.

SUMMARY

In an embodiment, a method includes: increasing an initiating force output by an initiating channel of an actuator of an aircraft; stopping the increasing of the initiating force in response to observing restraining forces on restraining channels of the actuator; holding the initiating force at a quiescent initiating value while the restraining channels hold the restraining forces at quiescent restraining values; increasing the initiating force to a target initiating value while the restraining channels increase the restraining forces to target restraining values; calculating a force fight test result by summing a difference between the target initiating value and the quiescent initiating value with differences between the target restraining values and the quiescent restraining values; and indicating the actuator failed verification in response to the force fight test result being greater than a first predetermined threshold. In some embodiments of the method, the initiating channel and the restraining channels are each controlled by a different flight control computer of the aircraft. In some embodiments of the method, the initiating channel and the restraining channels are servos. In some embodiments of the method, the initiating force is increased to the quiescent initiating value at a first rate, the initiating force is increased to the target initiating value at a second rate, and the first rate is different from the second rate. In some embodiments of the method, the initiating force is increased to the quiescent initiating value at a first rate, the initiating force is increased to the target initiating value at the first rate. In some embodiments of the method, the initiating force is a positive initiating force. In some embodiments of the method, the initiating force is a negative initiating force. In some embodiments of the method, indicating the actuator failed verification includes: indicating the actuator failed verification using a display of an instrument panel of the aircraft. In some embodiments, the method further includes: indicating the actuator failed verification in response to the target initiating value being less than a second predetermined threshold. In some embodiments, the method further includes: determining a current used to drive the initiating channel to the target initiating value; and indicating the actuator failed verification in response to the current being greater than a second predetermined threshold.

In an embodiment, an aircraft includes: an actuator; and a flight control computer interfaced with the actuator, the flight control computer configured to: increase an initiating force output by an initiating channel of the actuator; stop the increasing of the initiating force in response to observing restraining forces on restraining channels of the actuator; hold the initiating force at a quiescent initiating value while the restraining channels hold the restraining forces at quiescent restraining values; increase the initiating force to a target initiating value while the restraining channels increase the restraining forces to target restraining values; calculate a force fight test result by summing a difference between the target initiating value and the quiescent initiating value with differences between the target restraining values and the quiescent restraining values; and indicate the actuator failed verification in response to the force fight test result being greater than a first predetermined threshold. In some embodiments of the aircraft, the initiating channel and the restraining channels are each controlled by a different flight control computer of the aircraft. In some embodiments of the aircraft, the initiating channel and the restraining channels are servos. In some embodiments of the aircraft, the initiating force is increased to the quiescent initiating value at a first rate, the initiating force is increased to the target initiating value at a second rate, and the first rate is different from the second rate. In some embodiments of the aircraft, the initiating force is increased to the quiescent initiating value at a first rate, the initiating force is increased to the target initiating value at the first rate. In some embodiments of the aircraft, the initiating force is a positive initiating force. In some embodiments of the aircraft, the initiating force is a negative initiating force. In some embodiments, the aircraft further includes: an instrument panel including a display, where the flight control computer is configured to indicate the actuator failed verification by indicating the actuator failed verification using the display of the instrument panel. In some embodiments of the aircraft, the flight control computer is further configured to: indicate the actuator failed verification in response to the target initiating value being less than a second predetermined threshold. In some embodiments of the aircraft, the flight control computer is further configured to: determine a current used to drive the initiating channel to the target initiating value; and indicate the actuator failed verification in response to the current being greater than a second predetermined threshold.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
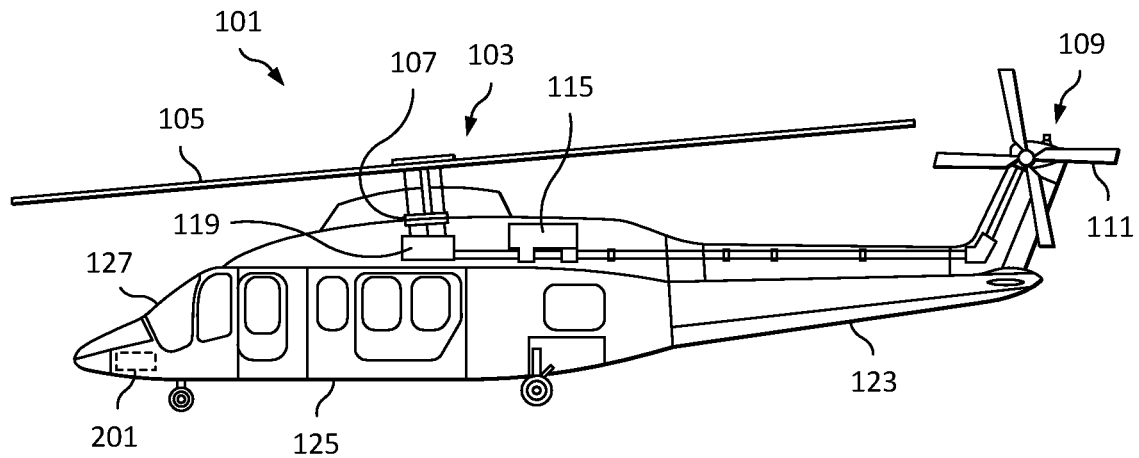
FIG. 1 illustrates a rotorcraft, according to some embodiments.

Illustrative embodiments of the system and method of the present disclosure are described below. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The increasing use of rotorcraft, in particular, for commercial and military applications, has led to the development of larger and more complex rotorcraft. However, as rotorcraft become larger and more complex, the differences between flying rotorcraft and fixed wing aircraft has become more pronounced. Since rotorcraft use one or more main rotors to simultaneously provide lift, control attitude, control altitude, and provide lateral or positional movement, different flight parameters and controls are tightly coupled to each other, as the aerodynamic characteristics of the main rotors affect each control and movement axis. For example, the flight characteristics of a rotorcraft at cruising speed or high speed may be significantly different than the flight characteristics at hover or at relatively low speeds. Additionally, different flight control inputs for different axes on the main rotor, such as cyclic inputs or collective inputs, affect other flight controls or flight characteristics of the rotorcraft. For example, pitching the nose of a rotorcraft forward to increase forward speed will generally cause the rotorcraft to lose altitude. In such a situation, the collective may be increased to maintain level flight, but the increase in collective requires increased power at the main rotor which, in turn, requires additional anti-torque force from the tail rotor. This is in contrast to fixed wing systems where the control inputs are less closely tied to each other and flight characteristics in different speed regimes are more closely related to each other.

Fly-by-wire (FBW) systems may be utilized in rotorcraft to assist pilots in stably flying the rotorcraft and to reduce workload on the pilots. The FBW system may provide different control characteristics or responses for cyclic, pedal or collective control input in the different flight regimes, and may provide stability assistance or enhancement by decoupling physical flight characteristics so that a pilot is relieved from needing to compensate for some flight commands issued to the rotorcraft. FBW systems may be implemented using one or more flight control computers (FCCs) disposed between the pilot controls and flight control systems, providing corrections to flight controls that assist in operating the rotorcraft more efficiently or that put the rotorcraft into a stable flight mode while still allowing the pilot to override the FBW control inputs. The FBW systems in a rotorcraft may, for example, automatically adjust power output by the engines based on a collective control input, apply collective or power correction during a cyclic control input, provide automation of one or more flight control procedures, provide for default or suggested control positioning, or the like.

FIG. 1 illustrates a rotorcraft 101, according to some embodiments. In this example, the rotorcraft 101 is a helicopter, but it should be appreciated that some teachings regarding the rotorcraft 101 may apply to aircraft other than helicopters, such as airplanes, tilt rotor aircraft, and the like. Further, although the rotorcraft 100 is depicted as including certain illustrated features, it should be appreciated that the rotorcraft 100 may have a variety of implementation-specific configurations.

The rotorcraft 101 includes a main rotor system 103, which includes a plurality of main rotor blades 105. The pitch of each main rotor blade 105 may be controlled by a swashplate 107 in order to selectively control the attitude, altitude and movement of the rotorcraft 101. The swashplate 107 may be used to collectively and/or cyclically change the pitch of the main rotor blades 105. The swashplate 107 may be controlled by one or more main rotor actuators. The rotorcraft 101 also has an anti-torque system, which may include a tail rotor 109, no-tail-rotor (NOTAR), or dual main rotor system. In rotorcraft with a tail rotor 109, the pitch of each tail rotor blade 111 is collectively changed in order to vary thrust of the anti-torque system, providing directional control of the rotorcraft 101. The pitch of the tail rotor blades 111 is changed by one or more tail rotor actuators. In some embodiments, the FBW system sends electrical signals to the tail rotor actuators and/or the main rotor actuators to control flight of the rotorcraft.

Power is supplied to the main rotor system 103 and the anti-torque system by one or more engines 115. The engines 115 may be controlled according to signals from the FBW system. The output of the engine 115 is provided to a driveshaft, which is mechanically and operatively coupled to the main rotor system 103 and the anti-torque system through a main rotor transmission 119 and a tail rotor transmission, respectively.

The rotorcraft 101 further includes a fuselage 125 and tail section 123. The tail section 123 may include other flight control devices such as horizontal or vertical stabilizers, rudder, elevators, or other control or stabilizing surfaces that are used to control or stabilize flight of the rotorcraft 101. The fuselage 125 includes a cockpit 127, which includes displays, controls, and instruments. It should be appreciated that even though rotorcraft 101 is depicted as having certain illustrated features, the rotorcraft 101 may have a variety of implementation-specific configurations. For instance, in some embodiments, the cockpit 127 is configured to accommodate a pilot or a pilot and co-pilot, as illustrated. It is also contemplated, however, that rotorcraft 101 may be operated remotely, in which case the cockpit 127 could be configured as a fully functioning cockpit to accommodate a pilot (and possibly a co-pilot as well) to provide for greater flexibility of use, or could be configured with a cockpit having limited functionality (e.g., a cockpit with accommodations for only one person who would function as the pilot operating perhaps with a remote co-pilot or who would function as a co-pilot or back-up pilot with the primary piloting functions being performed remotely). In yet other contemplated embodiments, rotorcraft 101 could be configured as an unmanned vehicle, in which case the cockpit 127 could be eliminated entirely in order to save space and cost.

Figure 2:
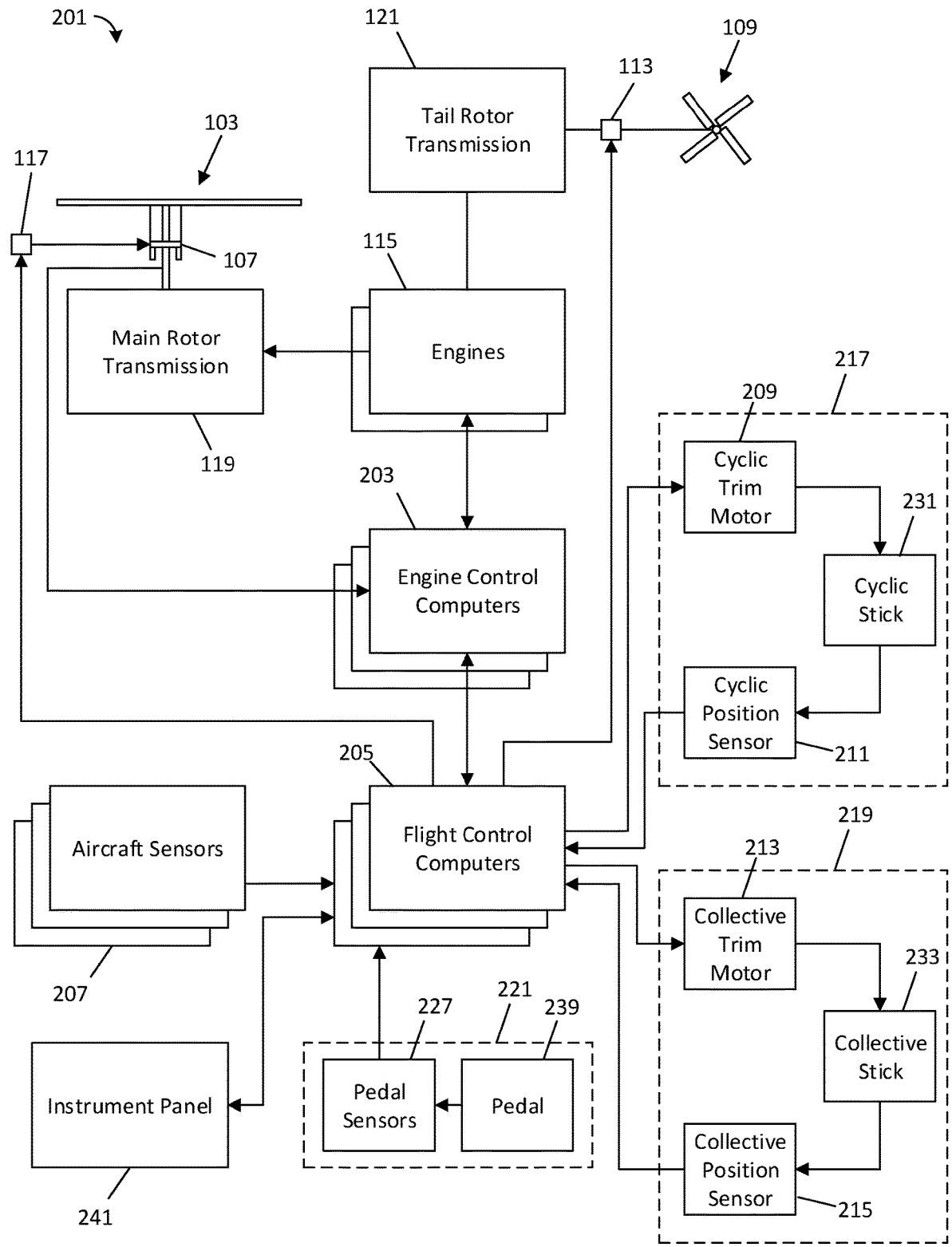
FIG. 2 is a block diagram of a fly-by-wire flight control system, according to some embodiments.

FIG. 2 is a block diagram of a flight control system 201 for the rotorcraft 101, according to some embodiments. The flight control system 201 is a fly-by-wire flight control system. A pilot may manipulate one or more pilot flight controls in order to control flight of the rotorcraft. The pilot flight controls may include manual controls such as a cyclic stick 231 in a cyclic control assembly 217, a collective stick 233 in a collective control assembly 219, and pedals 239 in a pedal control assembly 221. Inputs provided by the pilot to the pilot flight controls may be transmitted mechanically and/or electronically (e.g., via the flight control system 201) to flight control devices by the flight control system 201. Flight control devices may represent devices operable to change the flight characteristics of the rotorcraft 101. Flight control devices on the rotorcraft may include mechanical and/or electrical systems operable to change the positions or angle of attack of the main rotor blades 105 and the tail rotor blades 111 or to change the power output of the engines 115, as examples. Flight control devices include systems such as the swashplate 107, the main rotor actuators 117, the tail rotor actuator 113, and systems operable to control the engines 115. The flight control system 201 may adjust the flight control devices independently of the flight crew in order to stabilize the rotorcraft, reduce workload of the flight crew, and the like. The flight control system 201 includes one or more engine control computers (ECCs) 203, one or more flight control computers (FCCs) 205, and aircraft sensors 207, which collectively adjust the flight control devices.

The FCCs 205 are disposed between the pilot flight controls and the flight control devices. In some embodiments, multiple FCCs 205 are provided for redundancy, as subsequently described in greater detail for FIGS. 4-5. One or more modules within the FCCs 205 may be partially or wholly embodied as software and/or hardware for performing any functionality described herein. In embodiments where the flight control system 201 is a FBW flight control system, the FCCs 205 may analyze pilot inputs and dispatch corresponding commands to the ECCs 203, the tail rotor actuator 113, the main rotor actuators 117, and the like. Further, the FCCs 205 are configured to receive input commands from the pilot controls through sensors associated with each of the pilot flight controls. The input commands are received by measuring the positions of the pilot controls. The FCCs 205 may also control tactile cueing commands to the pilot controls or display information in instruments on, for example, an instrument panel 241.

The ECCs 203 control the engines 115. For example, the ECCs 203 may vary the output power of the engines 115 to control the rotational speed of the main rotor blades or the tail rotor blades. The ECCs 203 may control the output power of the engines 115 according to commands from the FCCs 205, or may do so based on feedback such as measured revolutions per minute (RPM) of the main rotor blades or measured revolution speed of the engines 115. The ECCs 203 may be part of the FCCs 205, or may be separate from the FCCs 205.

The aircraft sensors 207 are in communication with the FCCs 205. The aircraft sensors 207 may include sensors for measuring a variety of rotorcraft systems, flight parameters, environmental conditions and the like. For example, the aircraft sensors 207 may include sensors for measuring airspeed, altitude, attitude, position, temperature, vertical speed, and the like. Other aircraft sensors 207 could include sensors relying upon data or signals originating external to the rotorcraft, such as a global positioning system (GPS) sensor, a VHF Omnidirectional Range sensor, an Instrument Landing System (ILS), and the like.

The cyclic control assembly 217 includes one or more cyclic position sensors 211 and one or more cyclic trim motors 209. The cyclic position sensors 211 measure the position of the cyclic stick 231. In some embodiments, the cyclic stick 231 is a single control stick that moves along two axes and permits a pilot to control pitch, which is the vertical angle of the nose of the rotorcraft, and roll, which is the side-to-side angle of the rotorcraft. In some embodiments, the cyclic control assembly 217 has separate cyclic position sensors 211 that measure roll and pitch separately. The cyclic position sensors 211 for detecting roll and pitch generate roll and pitch signals, respectively, (sometimes referred to as cyclic longitude and cyclic latitude signals, respectively) which are sent to the FCCs 205, which controls the swashplate 107, the engines 115, the tail rotor 109, or related flight control devices. The cyclic trim motors 209 are connected to the FCCs 205, and receive signals from the FCCs 205 to move the cyclic stick 231. The FCCs 205 may send a cyclic stick position command to the cyclic trim motors 209. The cyclic stick position command may be determined in several manners. In some embodiments, the cyclic stick 231 is commanded so that the cyclic stick 231 is backdriven based on control signals previously sent to the flight control devices by the FCCs 205. In some embodiments, the cyclic stick 231 is commanded so as to provide tactile cueing to a pilot, e.g., to push the cyclic stick 231 in a particular direction when the pilot is moving the stick to indicate a particular condition. The FCCs 205 may cause the cyclic trim motors 209 to push against a pilot command so that the pilot feels a resistive force, or may command one or more friction devices to provide friction that is felt when the pilot moves the cyclic stick 231. In some embodiments, the cyclic stick 231 is commanded to a suggested position based on rotorcraft system conditions, flight conditions, or the like.

The collective control assembly 219 includes one or more collective position sensors 215 and one or more collective trim motors 213. The collective position sensors 215 measure the position of the collective stick 233. In some embodiments, the collective stick 233 is a single control stick that moves along a single axis or with a lever type action. A collective position sensor 215 detects the position of the collective stick 233 and sends a collective position signal to the FCCs 205, which controls engines 115, swashplate actuators, or related flight control devices according to the collective position signal to control the vertical movement of the rotorcraft. In some embodiments, the FCCs 205 may send a power command signal to the ECCs 203 and a collective command signal to the main rotor or swashplate actuators so that the angle of attack of the main blades is raised or lowered collectively, and the engine power is set to provide the needed power to keep the main rotor RPM substantially constant. The collective trim motors 213 are connected to the FCCs 205, and receive signals from the FCCs 205 to move the collective stick 233. The FCCs 205 may send a collective stick position command to the collective trim motors 213. The collective stick position command may be determined in several manners. In some embodiments, the collective stick 233 is commanded so that the collective stick 233 is backdriven based on control signals previously sent to the flight control devices by the FCCs 205. In some embodiments, the collective stick 233 is commanded so as to provide tactile cueing to a pilot, e.g., to push the collective stick 233 in a particular direction when the pilot is moving the stick to indicate a particular condition. The FCCs 205 may cause the collective trim motors 213 to push against a pilot command so that the pilot feels a resistive force, or may command one or more friction devices to provide friction that is felt when the pilot moves the collective stick 233. In some embodiments, the collective stick 233 is commanded to a suggested position based on rotorcraft system conditions, flight conditions, or the like.

The pedal control assembly 221 has one or more pedal sensors 227 that measure the position of pedals or other input elements in the pedal control assembly 221. In some embodiments, the pedal control assembly 221 is free of a trim motor or actuator, and may have a mechanical return element that centers the pedals when the pilot releases the pedals. In other embodiments, the pedal control assembly 221 has one or more trim motors that drive the pedal to a commanded pedal position according to a signal from the FCCs 205. The pedal sensors 227 detect the position of the pedals 239 and send pedal position signals to the FCCs 205, which controls the tail rotor 109 to cause the rotorcraft to yaw or rotate around a vertical axis.

Figure 3:
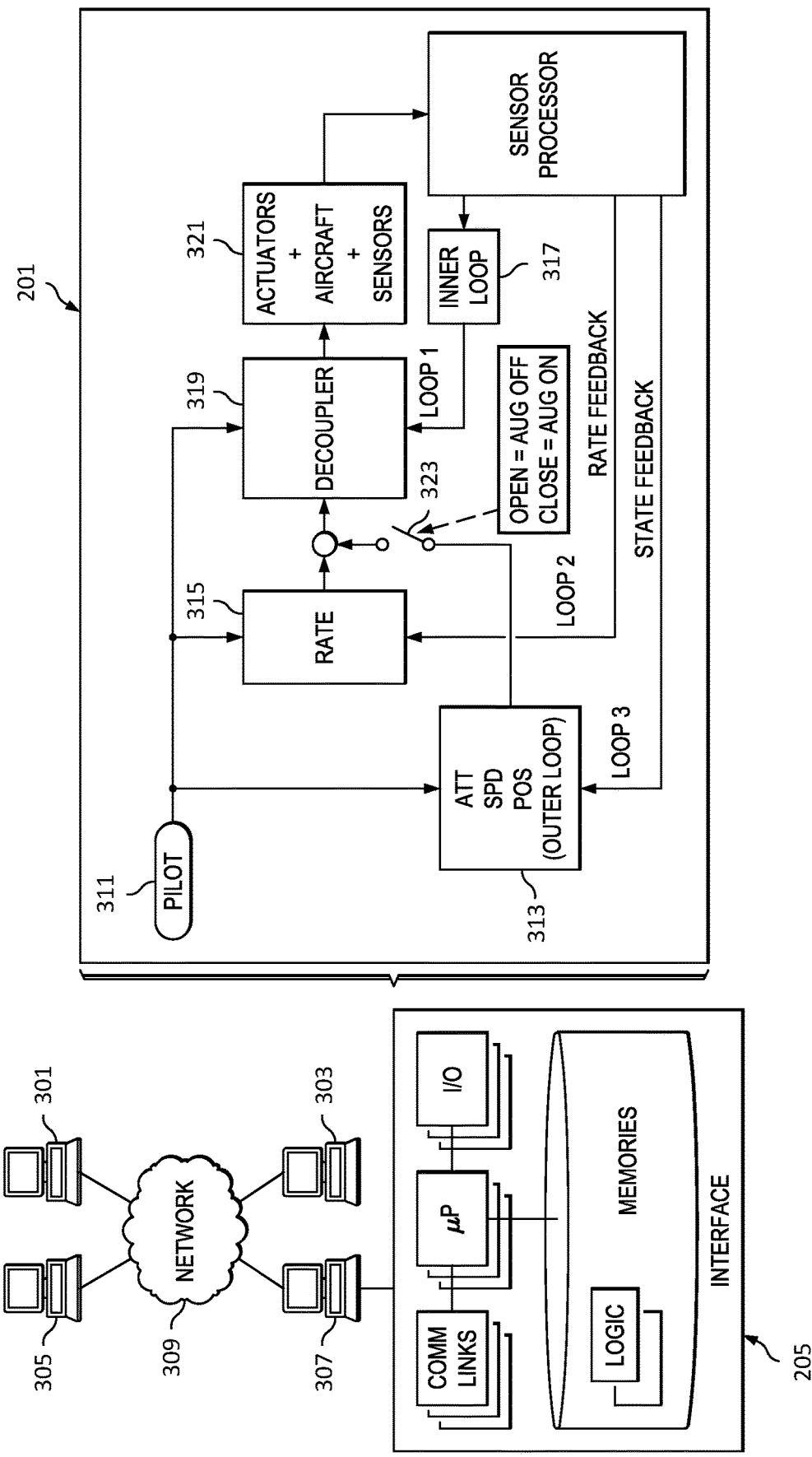
FIG. 3 is a block diagram of a three-loop flight control system, according to some embodiments.

FIG. 3 is a block diagram of the flight control system 201, according to some embodiments. Some operational aspects of the flight control system 201 are shown in a schematic fashion. In particular, the flight control system 201 is schematically shown as being implemented as a series of interrelated feedback loops running certain control laws. Although the flight control system 201 is illustrated as being a three-loop flight control system, it should be appreciated that the flight control system 201 could be implemented in a different manner, such as with a different quantity of control loops.

In some embodiments, elements of the flight control system 201 may be implemented at least partially by the FCCs 205. However, all, some, or none of the components 301, 303, 305, 307 of the flight control system 201 could be located external or remote from the rotorcraft 101 and communicate to on-board devices through a network connection 309.

The flight control system 201 includes a pilot input 311, an outer loop 313, a middle loop 315, an inner loop 317, a decoupler 319, and aircraft equipment 321. The pilot input 311 may correspond to, e.g., pilot flight controls such as the cyclic stick 231, the collective stick 233, the pedals 239, etc. The aircraft equipment 321 may correspond to, e.g., flight control devices such as the swashplate 107; actuators such as the main rotor actuators 117, the tail rotor actuator 113, etc.; sensors such as the aircraft sensors 207, the cyclic position sensors 211, the collective position sensors 215, etc.; and the like.

In the example shown, a three-loop design separates the inner stabilization and rate feedback loop(s) from outer guidance and tracking loop(s). The control law structure primarily assigns the overall stabilization task and related tasks of reducing pilot workload to the inner loop 317. Next, the middle loop 315 (sometimes called the rate loop) provides rate augmentation. The outer loop 313 focuses on guidance and tracking tasks. Since the inner loop 317 and the middle loop 315 provide most of the stabilization, less control effort is required at the outer loop 313. As representatively illustrated, a switch 323 may be provided to turn outer loop flight augmentation on and off. Accordingly, the tasks of outer loop 313 are not necessary for flight stabilization.

In some embodiments, the inner loop 317 and the middle loop 315 include a set of gains and filters applied to roll/pitch/yaw 3-axis rate gyro and acceleration feedback sensors. Both the inner loop 317 and the middle loop 315 may stay active, independent of various outer loop hold modes. The outer loop 313 may include cascaded layers of loops, including an attitude loop, a speed loop, a position loop, a vertical speed loop, an altitude loop, and a heading loop. According to some embodiments, the control laws running in the illustrated loops allow for decoupling of otherwise coupled flight characteristics, which in turn may provide for more stable flight characteristics and reduced pilot workload. Furthermore, the outer loop 313 may allow for automated or semi-automated operation of certain high-level tasks or flight patterns, thus further relieving the pilot workload and allowing the pilot to focus on other matters including observation of the surrounding terrain.

The flight control system 201 may be realized as programming executed by the FCCs 205. The programming includes instructions implementing aspects of the flight control system 201. The FCCs 205 may include memories, such as non-transitory computer readable storage mediums, that store the programming. One or more processors are connected to the memories, and are operable to execute the programming.

Figure 4:
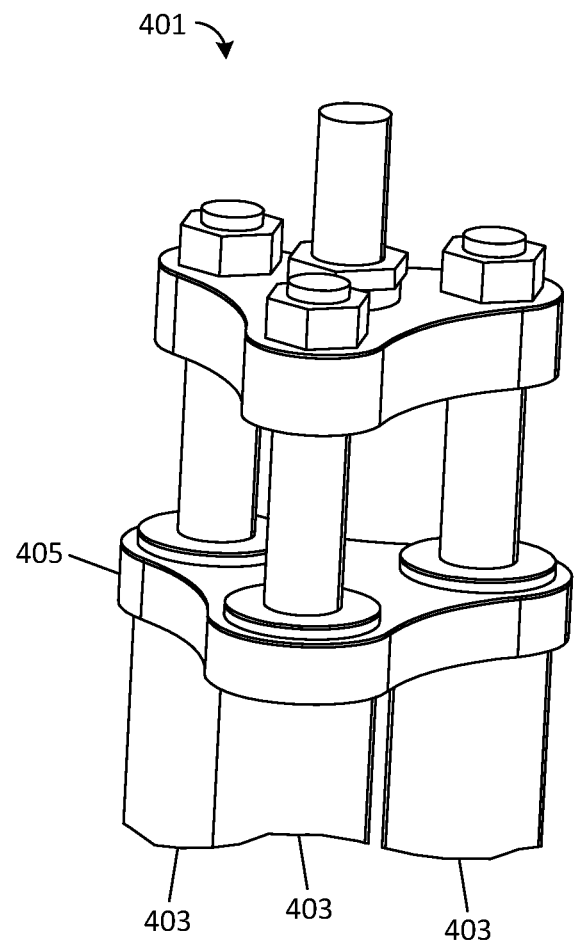
FIG. 4 is a three-dimensional view of a portion of an actuator, according to some embodiments.

FIG. 4 is a three-dimensional view of a portion of an actuator 401, according to some embodiments. In this example, the actuator 401 is a multi-channel actuator, such as a triplex-channel actuator having multiple barrels, and FIG. 4 shows the portion of the actuator 401 where the barrels of the actuator 401 are tied together. The actuator 401 may correspond to, e.g., the main rotor actuators 117, the tail rotor actuator 113, etc. (see FIG. 2). Specifically, the actuator 401 includes a plurality of channels 403 and a summer 405. Each channel 403 is controlled by a corresponding command from an FCC 205 (see FIG. 2). During flight, a channel 403 is commanded to a desired position, which causes the channel 403 to generate force as a result of moving to the commanded position. During testing, a channel 403 is commanded to generate a desired force. In some embodiments, the channels 403 are servos, which are commanded to desired positions by the FCCs 205 to generate a desired force. The summer 405 sums the forces generated by the channels 403, thereby producing the output force from the actuator 401. In some embodiments, the summer 405 is a rigid structure formed from, e.g., metal, which is coupled to the output of each of the channels 403.

The actuator 401 further includes sensors (not separately illustrated in FIG. 4) for measuring the state of the channels 403. The actuator sensors may include output sensors used to measure the output of (e.g., force produced by) the actuator 401. In some embodiments, a plurality of actuator sensors may be used to measure the outputs of the channels 403 of the actuator 401. The actuator sensors may be, e.g., delta-pressure ($\Delta P$) sensors, which the flight control system may use to determine the output of each channel 403. For example, each channel 403 may include a delta-pressure sensor for measuring the force produced by that channel 403. Other types of actuator sensors may be used in addition to the output sensors. For example, the actuator sensors may further include position sensors used to measure the position of the actuator 401. During flight, the measured position of a channel 403 may be used by a control loop when moving the channel 403 to a desired position.

As previously noted, multiple FCCs 205 (see FIG. 2) may be provided for redundancy. Specifically, multiple FCCs 205 are used in order to guarantee functionality of the flight control system 201 in the case of failures in one or more units. The actuator 401 is a multi-channel actuator to accommodate the use of multiple FCCs 205. Each channel 403 of the actuator 401 is coupled to and controlled by a different FCC 205. As a result, in the event an FCC 205 fails, only the channel 403 corresponding to the failed FCC 205 will stop operating. The remaining channels 403 may continue operating and, through the summer 405, continue producing output force from the actuator 401. Indeed, the actuator 401 may be capable of operating with only one channel 403, which may help avoid failure of the rotorcraft 101.

Figure 5:
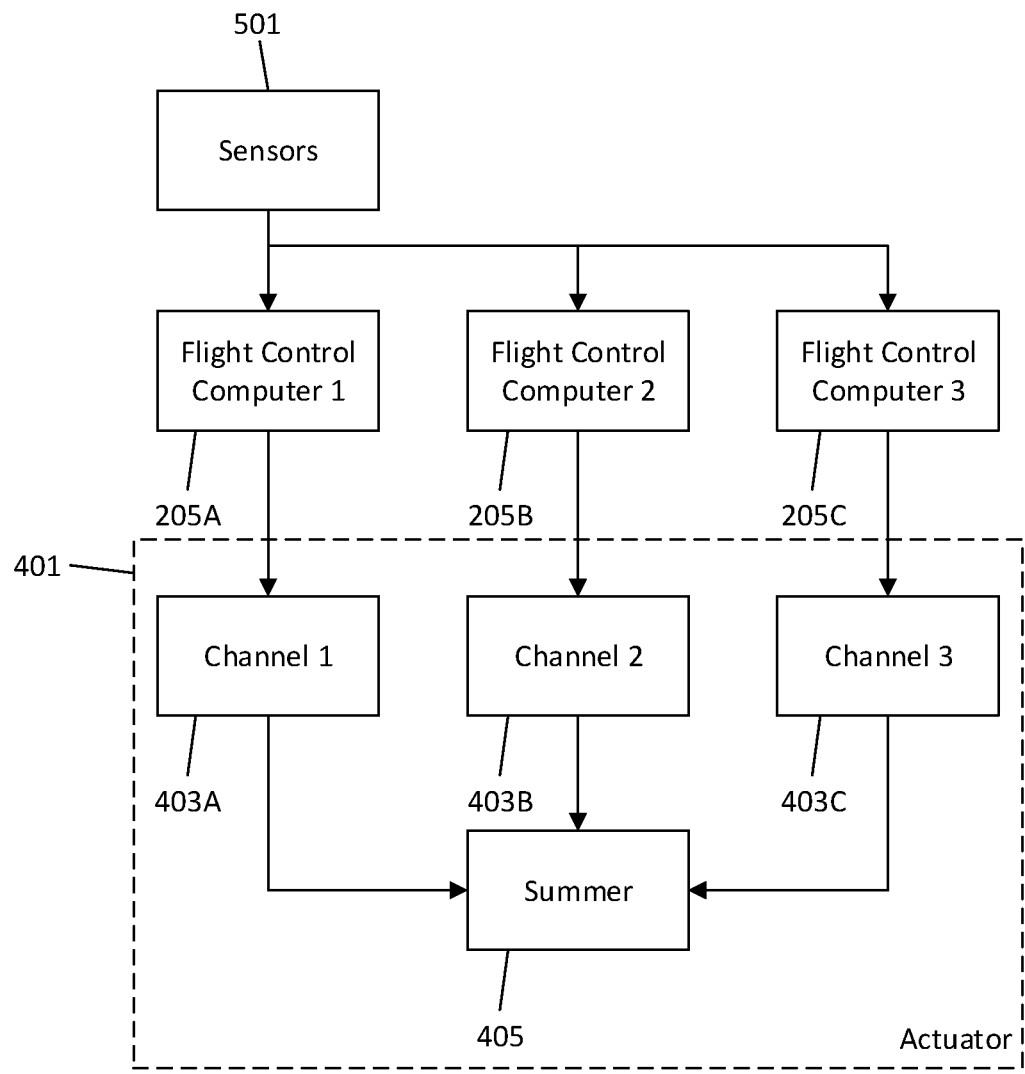
FIG. 5 is a block diagram of an actuator interfacing with a redundant flight control system, according to some embodiments.

FIG. 5 is a block diagram of an actuator 401 interfacing with a redundant flight control system, according to some embodiments. In this embodiment, the flight control system is a triple-redundant flight control system, including a first FCC 205A, a second FCC 205B, and a third FCC 205C. Additionally, the actuator 401 includes a first channel 403A, a second channel 403B, and a third channel 403C, which interface with the first FCC 205A, the second FCC 205B, and the third FCC 205C, respectively. Other degrees of redundancy may be utilized, in which case there may be more/fewer FCCs and actuator channels.

The FCCs 205A, 205B, 205C are each configured to receive sensor signals from sensors 501 and dispatch corresponding commands to the actuators 401. The sensors 501 may correspond to the aircraft sensors 207, the cyclic position sensors 211, the collective position sensors 215, the sensors of the actuators 401, etc. The FCCs 205A, 205B, 205C are capable of operating independently of one another, such that each FCC 205 may continue operating the rotorcraft 101 in the case of failures in one or more units. In some embodiments, the FCCs 205A, 205B, 205C may communicate with one another in order to generate commands for the actuators 401. The FCCs 205A, 205B, 205C may be different from one another, such as by including different makes/models of components (e.g., processors, memories, etc.), which may increase redundancy of the flight control system. During flight, the FCCs 205A, 205B, 205C each dispatch commands to, respectively, the first channel 403A, the second channel 403B, and the third channel 403C of the actuator 401. The first channel 403A, the second channel 403B, and the third channel 403C each produce an output based on the commands, and those channel outputs are combined by the summer 405 to produce a unified output from the actuator 401.

During flight, an actuator 401 may be commanded to produce a desired output by individually controlling each of the channels 403A, 403B, 403C to produce a similar output. Due to manufacturing variations or channel tolerances, the outputs of the channels 403A, 403B, 403C may not be identical, thereby causing a force fight. The FCCs 205A, 205B, 205C are configured to perform force equalization in real-time during flight, thereby reducing force fights. Force equalization reduces the difference between the outputs of the channels 403A, 403B, 403C. Specifically, the actual output of each actuator channel is measured, and the difference between the desired and actual output of the actuator channel is reduced by offsetting the commanded output of the actuator channel based on the difference between the desired and actual output. As a result, the channels 403A, 403B, 403C may each be more accurately controlled to produce a desired output, and the differences between those outputs may be reduced. Reducing force fights may reduce wear on components of the actuator (e.g., the summer 405, rods for the channels 403, housing etc.), thereby increasing the lifespan of the actuator 401, and may also improve performance of the actuator 401.

Force equalization relies on accurately determining the actual outputs of the channels 403A, 403B, 403C. The actual outputs of the channels 403A, 403B, 403C are measured using sensors (previously described) of the actuator 401. Using inaccurate actuator sensors degrades the performance of the force equalization process. Indeed, using inaccurate actuator sensors may cause the force equalization process to exacerbate, rather than reduce, force fights. As subsequently described in greater detail, an actuator verification process will be performed pre-flight to verify both the accuracy of the actuator sensors and the load-rate capability of the actuator 401. An actuator 401 that fails verification (either by having inaccurate sensors or insufficient load-rate capability) may be unsuitable for flight and require replacement. Failure of the actuator verification process may be indicated to a pilot, such as by notifying the pilot of the failure using an instrument on the instrument panel 241 (see FIG. 2). The actuator verification process will include performing multiple force fight tests.

Figure 6:
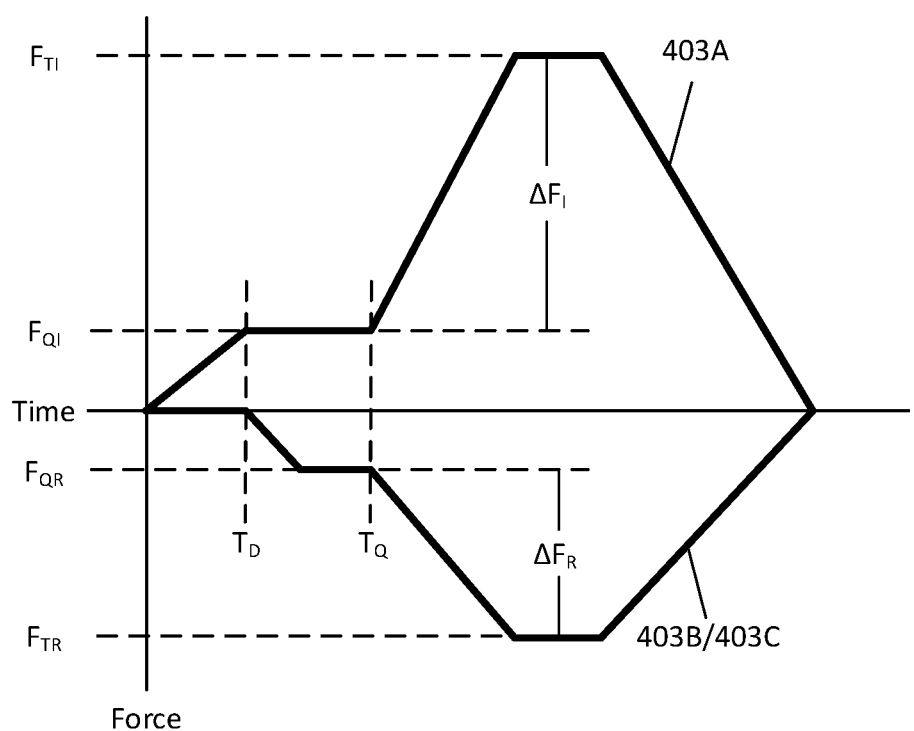
FIG. 6 is a chart of the output of an actuator channels during a force fight test, according to some embodiments.

FIG. 6 is a chart of the output of channels 403 of an actuator 401 during a force fight test, according to some embodiments. Specifically, the output force of the channels 403 is plotted as a function of time. The force fight test is performed by commanding an initiating channel (the first channel 403A in this example) to output an initiating force. The initiating force may be in either desired direction, e.g., may be a positive initiating force (such that the initiating channel exerts a pushing force) or a negative initiating force (such that the initiating channel exerts a pulling force). The initiating force is in the positive direction in this example. The other channels of the actuator 401 (the second channel 403B and the third channel 403C in this example) are not provided the same command as the initiating channel during the force fight test; instead, the initiating force is applied to the other channels through the summer 405. As noted above, the channels 403A, 403B, 403C are servos. As a result, the other (non-initiating) channels act as restraining channels and each output a restraining force to resist the initiating force applied through the summer 405. In an embodiment where the flight control system is a triple-redundant flight control system, the restraining force output by each restraining channel ideally has half the magnitude of the initiating force and has opposite polarity from the initiating force. The initiating force is increased to a desired maximum initiating value, such as a target initiating value Fri, which causes the restraining forces to each be increased to a maximum responding value, such as a target restraining value $F_{TR}$.

When an actuator is properly functioning, the combined restraining forces will be approximately equal and opposite the initiating force (within a margin of error). The sum of the initiating and restraining forces indicates whether the forces are approximately equal and opposite. The sum being less than a desired value indicates the combined restraining forces are approximately equal and opposite the initiating force (within a margin of error), where the desired sum value is based on the desired margin of error. The initiating force should have good correlation with the restraining forces to correctly calculate their sum. However, undesirable forces caused by friction, stiction, swashplate weight, and the like may result in the restraining forces being delayed or uncorrelated, relative to the initiating force. As a result of system delays, when the initiating force is applied (e.g., ramped) at time zero, the restraining forces may not be observed until a time $T_D$ that is after time zero. In the range of time zero to time $T_D$, the restraining forces have poor correlation with the initiating force. As subsequently described in greater detail, the negative impact of system delays during the force fight test will be removed by effectively discarding the forces measured before time $T_D$. The correlation between the initiating force and the restraining forces during the force fight test may thus be improved, which may improve the accuracy of the actuator verification process.

Figure 7:
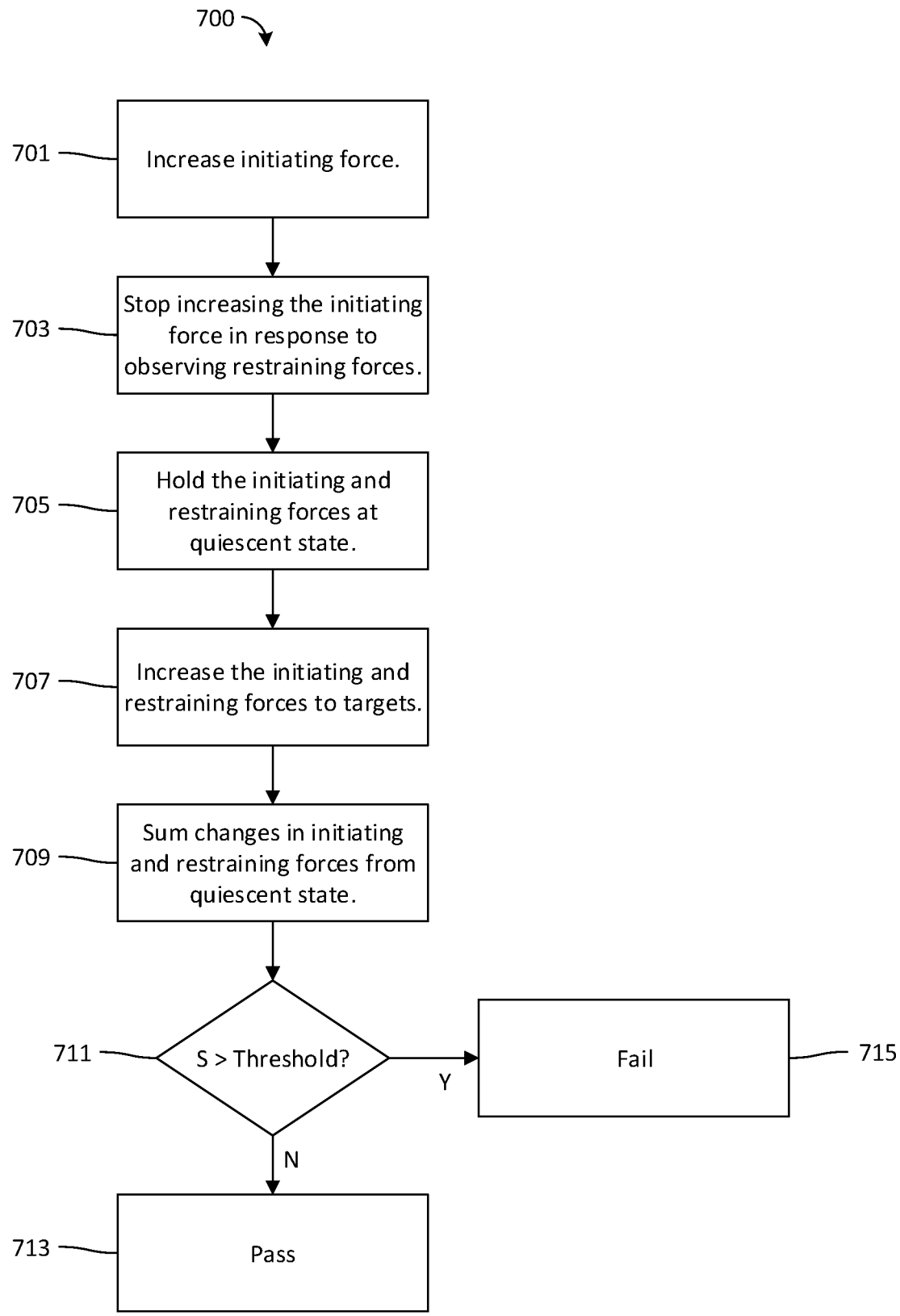
FIG. 7 is a diagram of a method for a force fight test, according to some embodiments.

FIG. 7 is a diagram of a method 700 for a force fight test, according to some embodiments. The method 700 is described in conjunction with FIGS. 5 and 6, and is described for an example initiating channel (e.g., the first channel 403A) and two example restraining channels (e.g., the second channel 403B and the third channel 403C). As subsequently described in greater detail, the method 700 will be performed multiple times during an actuator verification process, such as twice using each channel of an actuator as the initiating channel.

In step 701, an initiating force on the initiating channel is increased. The time at beginning of the increasing of the initiating force is treated as time zero (see FIG. 6). The initiating force is increased until restraining forces (responsive to the initiating force) are observed on the restraining channels. The restraining channels produce the restraining forces in response to the initiating force, e.g., as a result of servos of the restraining channels attempting to maintain a position.

In step 703, the increasing of the initiating force is stopped in response to observing restraining forces on the restraining channels. The increasing of the initiating force is stopped at time $T_D$ (see FIG. 6). Observing the restraining forces may include measuring an increase in the output forces of the restraining channels using the actuator sensors.

In step 705, the initiating force is held where it was stopped until a time $T_Q$ (see FIG. 6). In some embodiments, the initiating force is held until the restraining forces stop increasing. In response, the restraining channels hold the restraining forces. The initiating force may be held for a predetermined amount of time, which may be brief, such as a few milliseconds. At this point in time (e.g., time $T_Q$, see FIG. 6), the system is at equilibrium as a result of the system's forces (including the initiating forces, restraining forces, and undesirable forces) being balanced. This condition will be used as a new baseline quiescent state of the system. The initiating force is held at a quiescent initiating value $F_{QI}$ (see FIG. 6) by the initiating channel, and each of the restraining forces are held at a quiescent restraining value $F_{QR}$ (see FIG. 6) by a restraining channel. The quiescent initiating value $F_{QI}$ and the quiescent restraining values $F_{QR}$ are measured (e.g., using the actuator sensors) and stored (e.g., in memory of an FCC 205). The undesirable forces (e.g., frictional forces), the initiating force, and the restraining force sum to zero in the quiescent state. As a result, an increase in the initiating force will result in a corresponding increase in the restraining forces. Put another way, after time $T_Q$, the restraining forces have improved correlation with the initiating force (such as better correlation than before the time $T_D$).

In step 707, the initiating force is increased to a target initiating value $F_{TI}$ (see FIG. 6). In response, the restraining channels increase the restraining forces to target restraining values $F_{TR}$ (see FIG. 6). The target initiating value $F_{TI}$ and the target restraining values $F_{TR}$ are measured (e.g., using the actuator sensors) and stored (e.g., in memory of an FCC 205). The initiating force is then decreased to zero, which causes the restraining forces to decrease to zero.

The rate of the initiating force increasing to the target initiating value $F_{TI}$ may (or may not) be different than the rate of the initiating force increasing to the quiescent initiating value $F_{QI}$. In some embodiments, the rate of increase to the target initiating value $F_{TI}$ is the same as the rate of increase to the quiescent initiating value $F_{QI}$. In some embodiments, the rate of increase to the target initiating value $F_{TI}$ is greater than the rate of increase to the quiescent initiating value $F_{QI}$. The rate of change of the restraining forces is similar to the rate of change the initiating force, although reverse in polarity and scaled in magnitude.

$\Delta F_I = F_{TI} - F_{QI} \Delta F_R = F_{TR} - F_{QR}$ In step 709, a force fight test result is calculated by summing the change in initiating force $\Delta F_I$ (see FIG. 6) and the changes in restraining forces $\Delta F_R$ (see FIG. 6). The change in initiating force $\Delta F_I$ is computed by taking the difference between the target initiating value $F_{TI}$ and the quiescent initiating value $F_{QI}$ that were measured, according to Equation 1.

$$\Delta F_I = F_{TI} - F_{QI} \Delta F_R = F_{TR} - F_{QR} \qquad (1)$$

$\Delta F_I = F_{TI} - F_{QI} \Delta F_R = F_{TR} - F_{QR}$ The change in restraining force $\Delta F_R$ for a channel is computed by taking the difference between the target restraining value $F_{TR}$ and the quiescent restraining value $F_{QR}$ for that channel that were measured, according to Equation 2.

$$\Delta F_I = F_{TI} - F_{QI} \Delta F_R = F_{TR} - F_{QR} \qquad (2)$$

$\Delta F_I = F_{TI} - F_{QI} \Delta F_R = F_{TR} - F_{QR}$ The force fight test result (which is the sum of the change in initiating force $\Delta F_I$ and the changes in restraining forces $\Delta F_R$) being less than a desired value indicates the combined restraining forces are approximately equal and opposite the initiating force (within a margin of error). Notably, the changes in forces (relative the quiescent state) are summed, instead of summing the absolute forces. Using a sum of changes in forces may be more accurate than using a sum of absolute forces, as the sum of changes in forces may be less affected by system delays than the sum of absolute forces.

$R = \Delta F_I + \Delta F_{R1} + \Delta F_{R2}$ Consider an example with three actuator channels, where the change in initiating force $\Delta F_I$ for the initiating channel is 2149 Pounds, the change in restraining force $\Delta F_{R1}$ for the first restraining channel is $-972$ Pounds, and the change in restraining force $\Delta F_{R2}$ for the second restraining channel is $-917$ Pounds. The force fight test result R is calculated by summing the change in initiating force $\Delta F_I$ and the changes in restraining forces $\Delta F_{R1}$ and $\Delta F_{R2}$, according to Equation 3. In this example, the force fight test result R is 260 Pounds.

$$R = \Delta F_I + \Delta F_{R1} + \Delta F_{R2} \qquad (3)$$

In step 711, the force fight test result R is compared to a threshold. The threshold may be a predetermined threshold that is selected based on the desired life span of the actuator 401. In some embodiments, the threshold is in the range of 600 Pounds to 700 Pounds. If the force fight test result R is less than the threshold, then in step 713, the force fight test is considered passed. If the force fight test result R is greater than the threshold, then in step 715, the force fight test is considered failed. Continuing the previous example where the force fight test result R is 260 Pounds, if the threshold is in the range of 600 Pounds to 700 Pounds, then the force fight test will be considered passed. As subsequently described in greater detail, an actuator 401 which fails a force fight test will be considered to have failed an actuator verification process that includes the force fight test. The actuator 401 passing or failing the force fight test (or more generally, the actuator verification process) will be indicated to a pilot.

Additional criteria may be used to determine whether the force fight test is passed or failed. In some embodiments, the force fight test may also be considered failed if the initiating channel has insufficient load-rate capability. The load-rate capability of the initiating channel may be evaluated, among other processes, by determining whether the initiating channel is capable of outputting a desired maximum initiating force with desired maximum current. An initiating channel has insufficient load-rate capability when the channel cannot output the desired maximum initiating force, or when the channel cannot do so with less than the desired maximum current. For example, if the initiating channel is commanded to output a maximum initiating force, but the actuator sensors indicate the target initiating value $F_{TI}$ at maximum actuation is less than the desired maximum initiating force, the force fight test may be considered failed. Similarly, if the amount of current used to drive an actuator channel to the target initiating value $F_{TI}$ is greater than a desired amount of current, the force fight test may be considered failed. The desired maximum initiating force and the desired amount of current may be predetermined thresholds that are selected based on the desired flight control capability of the actuator 401. An actuator channel that fails to output a desired maximum force, or fails to do so with a desired amount of current, may have insufficient mechanical performance for flight.

Figure 8:
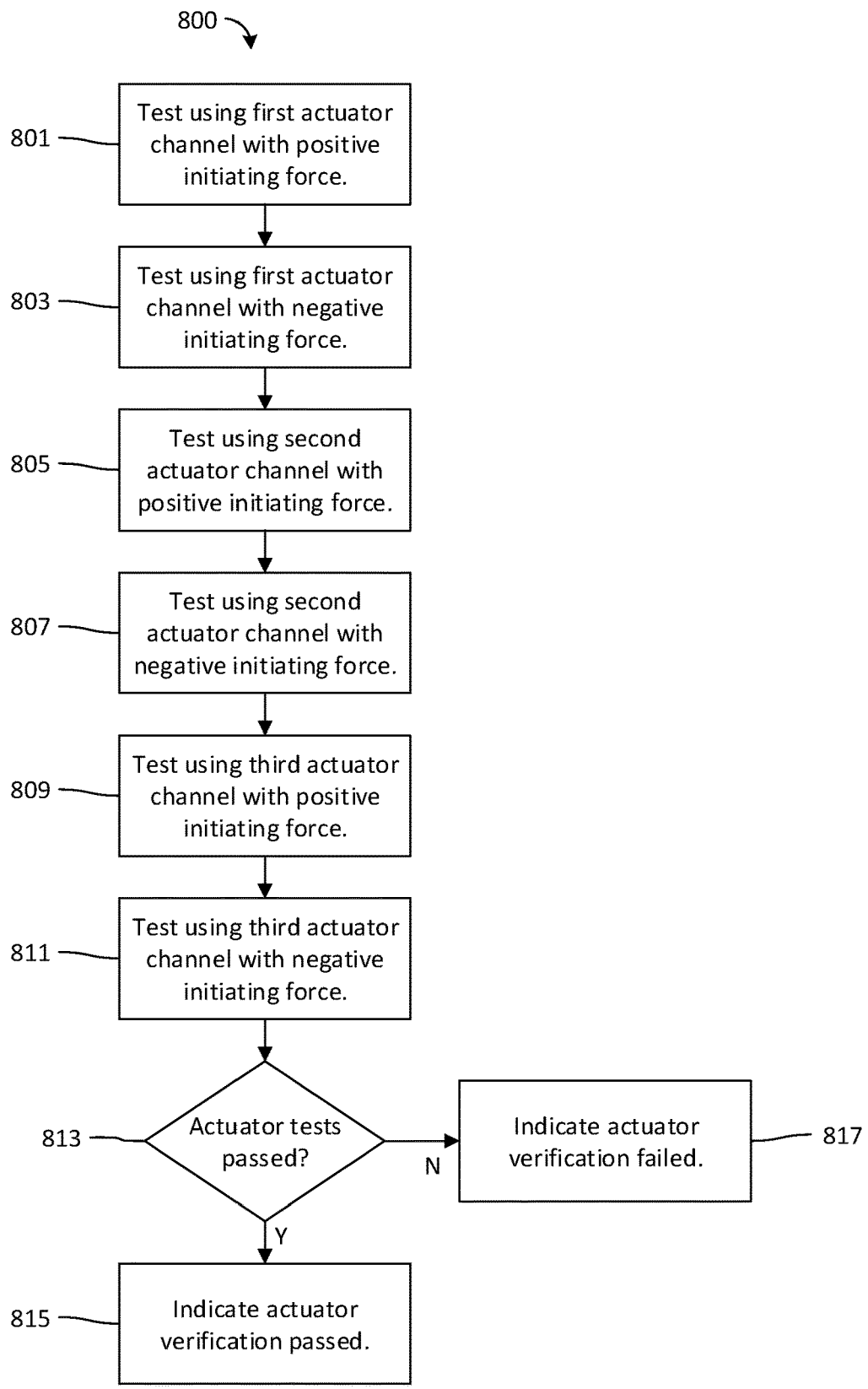
FIG. 8 a diagram of a method for an actuator verification process, according to some embodiments.

FIG. 8 is a diagram of a method 800 for an actuator verification process, according to some embodiments. The method 800 is described in conjunction with FIGS. 5-7. The actuator verification process includes performing a plurality of force fight tests (as previously described for FIGS. 6-7). In this example, the method 800 is performed to verify operation of a triplex-channel actuator, e.g., having a first channel 403A, a second channel 403B, and a third channel 403C.

In step 801, a first force fight test is performed using the first channel 403A as the initiating channel, and with an initiating force in a first direction. For example, the first channel 403A may be commanded to output a positive initiating force.

In step 803, a second force fight test is performed using the first channel 403A as the initiating channel, and with an initiating force in a second direction. The second direction is opposite the first direction. For example, the first channel 403A may be commanded to output a negative initiating force.

In step 805, a third force fight test is performed using the second channel 403B as the initiating channel, and with an initiating force in the first direction. For example, the second channel 403B may be commanded to output a positive initiating force.

In step 807, a fourth force fight test is performed using the second channel 403B as the initiating channel, and with an initiating force in the second direction. For example, the second channel 403B may be commanded to output a negative initiating force.

In step 809, a fifth force fight test is performed using the third channel 403C as the initiating channel, and with an initiating force in the first direction. For example, the third channel 403C may be commanded to output a positive initiating force.

In step 811, a sixth force fight test is performed using the third channel 403C as the initiating channel, and with an initiating force in the second direction. For example, the third channel 403C may be commanded to output a negative initiating force.

In step 813, the results of the first through sixth force fight tests are evaluated. If any of the force fight tests failed (as previously described), then the actuator verification process is considered failed. If all of the force fight tests passed, then the actuator verification process is considered passed. If the actuator verification process passes, then in step 815, the passing of the actuator verification process is indicated to a pilot. If the actuator verification process fails, then in step 817, the failing of the actuator verification process is indicated to the pilot. The pilot may be notified of the passing or failing using an instrument on the instrument panel 241 (see FIG. 2). For example, a display on instrument panel 241 may be used to render text indicating passing or failing of the actuator verification process. In some embodiments, indication is only provided in the case of a failure, e.g., the failing of the actuator verification process is indicated to a pilot but the passing of the actuator verification process is not indicated to the pilot.

Although some embodiments have been described in the context of a triplex-channel actuator, it should be appreciated that embodiment techniques may be applied to other types of actuators. For example, the actuator may include a plurality of simplex actuators, each with independent connections to a control surface. Similarly, the actuator may have a single channel that is controlled by three servo loops that are internally summed to control the single channel.

Embodiments may achieve advantages. Ramping the initiating force until responsive restraining forces are observed, and then using that point as a new quiescent state may improve accuracy of a force fight test, such as by reducing system delays and improving the correlation between the initiating force and the restraining forces during the force fight test. The accuracy of the actuator verification process may thus be improved, reducing the risk of false positives and false negatives. The risk of flying a rotorcraft with an incorrectly functioning force equalization process may thus be reduced, thereby decreasing the risk of actuator failure.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:
increasing, by a flight control computer, an initiating force output by an initiating channel of an actuator of an aircraft;
stopping, by the flight control computer, the increasing of the initiating force in response to observing restraining forces on restraining channels of the actuator;
holding, by the flight control computer, the initiating force at a quiescent initiating value while the restraining channels hold the restraining forces at quiescent restraining values;

increasing the initiating force to a target initiating value while the restraining channels increase the restraining forces to target restraining values;

calculating a force fight test result by summing a difference between the target initiating value and the quiescent initiating value with differences between the target restraining values and the quiescent restraining values; and indicating the actuator failed verification in response to the force fight test result being greater than a first predetermined threshold.

2. The method of claim 1, wherein the initiating channel and the restraining channels are each controlled by a different flight control computer of the aircraft.

3. The method of claim 1, wherein the initiating channel and the restraining channels are servos.

4. The method of claim 1, wherein the initiating force is increased to the quiescent initiating value at a first rate, the initiating force is increased to the target initiating value at a second rate, and the first rate is different from the second rate.

5. The method of claim 1, wherein the initiating force is increased to the quiescent initiating value at a first rate, the initiating force is increased to the target initiating value at the first rate.

6. The method of claim 1, wherein the initiating force is a positive initiating force.

7. The method of claim 1, wherein the initiating force is a negative initiating force.

8. The method of claim 1, wherein indicating the actuator failed verification comprises:

indicating the actuator failed verification using a display of an instrument panel of the aircraft.

9. The method of claim 1 further comprising:

indicating the actuator failed verification in response to the target initiating value being less than a second predetermined threshold.

10. The method of claim 1 further comprising:

determining a current used to drive the initiating channel to the target initiating value; and indicating the actuator failed verification in response to the current being greater than a second predetermined threshold.

11. An aircraft comprising:

an actuator; and a flight control computer interfaced with the actuator, the flight control computer configured to:

increase an initiating force output by an initiating channel of the actuator;

stop the increasing of the initiating force in response to observing restraining forces on restraining channels of the actuator;

hold the initiating force at a quiescent initiating value while the restraining channels hold the restraining forces at quiescent restraining values;

increase the initiating force to a target initiating value while the restraining channels increase the restraining forces to target restraining values;

calculate a force fight test result by summing a difference between the target initiating value and the quiescent initiating value with differences between the target restraining values and the quiescent restraining values; and indicate the actuator failed verification in response to the force fight test result being greater than a first predetermined threshold.

12. The aircraft of claim 11, wherein the initiating channel and the restraining channels are each controlled by a different flight control computer of the aircraft.

13. The aircraft of claim 11, wherein the initiating channel and the restraining channels are servos.

14. The aircraft of claim 11, wherein the initiating force is increased to the quiescent initiating value at a first rate, the initiating force is increased to the target initiating value at a second rate, and the first rate is different from the second rate.

15. The aircraft of claim 11, wherein the initiating force is increased to the quiescent initiating value at a first rate, the initiating force is increased to the target initiating value at the first rate.

16. The aircraft of claim 11, wherein the initiating force is a positive initiating force.

17. The aircraft of claim 11, wherein the initiating force is a negative initiating force.

18. The aircraft of claim 11 further comprising:

an instrument panel comprising a display, wherein the flight control computer is configured to indicate the actuator failed verification by indicating the actuator failed verification using the display of the instrument panel.

19. The aircraft of claim 11, wherein the flight control computer is further configured to:

indicate the actuator failed verification in response to the target initiating value being less than a second predetermined threshold.

20. The aircraft of claim 11, wherein the flight control computer is further configured to:

determine a current used to drive the initiating channel to the target initiating value; and indicate the actuator failed verification in response to the current being greater than a second predetermined threshold.

* * * * *